United States Patent

[11] 3,571,922

| [72] | Inventors | Donald G. Schweitzer<br>Bayport;<br>Louis J. Nicolosi, Commack, N.Y. |
|---|---|---|
| [21] | Appl. No. | 743,701 |
| [22] | Filed | July 10, 1968 |
| [45] | Patented | Mar. 23, 1971 |
| [73] | Assignee | The United States of America as represented by the United States Atomic Energy Commission |

[54] METHOD OF FABRICATING A STRAINED SUPERCONDUCTOR MAGNET
9 Claims, 10 Drawing Figs.

[52] U.S. Cl. ................................................. 29/599
[51] Int. Cl. .............................................. H01v 11/00
[50] Field of Search ...................................... 29/599; 317/123

[56] References Cited
UNITED STATES PATENTS

| 3,215,569 | 11/1965 | Kneip et al. .................. | 148/133 |
| 3,514,662 | 5/1970 | Eldredge ...................... | 29/599X |

FOREIGN PATENTS

| 1,004,963 | 9/1965 | Great Britain ................ | 340/173.1 |

Primary Examiner—John F. Campbell
Assistant Examiner—D. C. Reiley
Attorney—Roland A. Anderson ABSTRACT: Method for straining a type I superconductor cylinder for retaining a desired magnetic field gradient in the bore thereof.

INVENTORS.
DONALD G. SCHWEITZER
BY LOUIS J. NICOLOSI

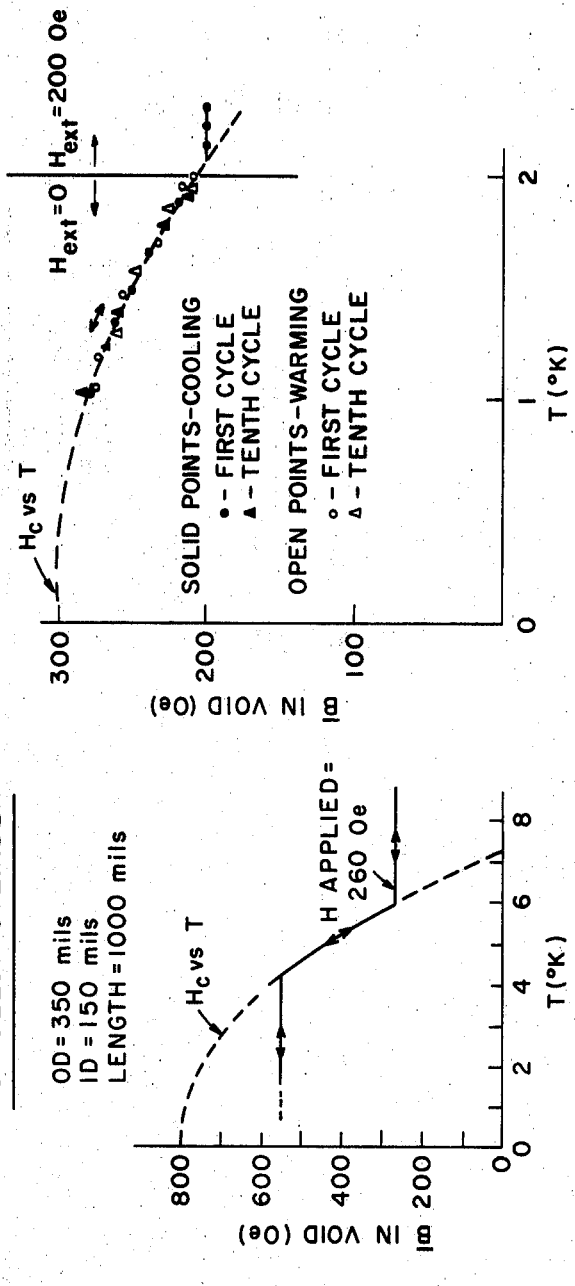

METHOD OF FABRICATING A STRAINED SUPERCONDUCTOR MAGNET

CROSS-REFERENCE TO RELATED APPLICATIONS

"Magnetic Energy Storage System" by Donald G. Schweitzer, Ser. No. 700,234 filed Jan. 24, 1968 now Pat. No. 3,518,496, and assigned to the assignee of this application, now U.S. Pat. No. 3,518,496. AEC Docket S–36,371 —S–3 6,372, "Superconducting Current Loop Having Preferential Current Flow" by Schweitzer and Adams, filed concurrently herewith, assigned to the assignee of this application, now copending application Ser. No. 743,700, filed Jul. 10, 1968, by Schweitzer and Adams.

BACKGROUND OF THE INVENTION

1. Field of Invention

This invention relates to a method for making superconductive devices and more particularly to a method for making superconductive devices from type I superconductors.

2. Description of the Prior Art

As described on page 117 et seq. of the Mar. 1967 Scientific American superconductors have heretofore been divided into two categories, called Type I and type II superconductors, that are classified according to how they behave in an externally applied magnetic field. Type II superconductors, such as the intermetallic compound of niobium and tin ($Nb_3Sn$) and the two metallic alloys of niobium-zirconium (Nb-Zr) and niobium-titanium (Nb-Ti) have been so classified on the basis that they exclude increasing externally applied fields until a first critical field is reached, at which point partial field penetration occurs. Thereafter, full field penetration occurs at a higher second critical field. The type I superconductors, on the other hand, such as lead, tin and indium, have been so classified on the basis that they exclude from the interior thereof the increasing externally applied field up to the critical field $H_c$ of the superconductor, whereupon the sample losses all trace of superconductivity and the external field penetrates fully into the interior of the superconductor.

In the field of physics it is desirable to utilize the described field shielding properties of type I superconductors for retaining a magnetic field in the bore of a superconducting cylinder. Various proposals have been made and used to accomplish such field retention, comprising the arrangements shown and described in U.S. Pat. Nos. 3,262,024 and 3,323,089. While these arrangements are useful and can accomplish field retention in the bore of the cylinder the retained fields have been essentially uniform in magnitude along the length of the bore of the cylinder in a direction parallel to the bore axis and the distribution has been determined by uniform field devices that produced the field before the superconducting cylinder retained it in accordance with conventional magnetic techniques.

SUMMARY OF THE INVENTION

The invention described herein was made in the course of, or under a contract with the United States Atomic Energy Commission.

In accordance with this invention, it has been discovered that the shielding properties of type I superconductors, are influenced by localized phenomena. Accordingly, the method of this invention introduces local surface strains that increase the local shielding properties during the application of an external field whereby large axial field gradients can be retained in the bore of superconductor cylinders after the externally applied field is removed. In one embodiment, a particular dipole field is retained for deflecting charged particles. Moreover, high fields of both senses can be retained in the bore simultaneously when cycles are performed involving both senses of the applied field.

Various other novel features will appear from the following description of one embodiment of this invention, and the novel features will be particularly pointed out hereinafter in connection with the appended claims.

BRIEF DESCRIPTION OF THE DRAWINGS

In the drawings where like elements are referenced alike:

FIG. 9a is a graphic illustration of spontaneous field enhancement in the cylinder of FIG. 1 in accordance with this invention;

FIG. 9b is another illustration of spontaneous field enhancement in the cylinder of FIG. 1.

DESCRIPTION OF THE PREFERRED EMBODIMENTS

In accordance with this invention, it has been discovered that the new properties exhibited by strained solids, hollow cylinders, discs and various other geometries of solids in hollow cylinders of Pb, Sn, In and other type I superconductors, are related to the effects generally associated with hysteresis in type II superconductors, such as described in the above cited copending application by the coinventor of this application. In this regard, studies have shown that the shielding and field retaining properties of type I superconductors are affected by strains at the surface of the superconductors, and to this end particular straining techniques are employed. As will be understood in more detail hereinafter, the effects of this straining on the diamagnetic properties of the superconductors tested, were achieved under isothermal conditions where the applied fields were varied and under conditions where the temperature was varied when the externally applied fields were kept constant. Also, in these studies the wall thickness ranged from 5 mils to 50 mils or more, for inside diameters of 150 mils to 1000 mils or more and for lengths from 15 mils to 5000 mils or more. Moreover, in these studies the measurements were stable with time and independent of field sweep for field sweeps of less than 10 Oe/sec.

Figure 1:
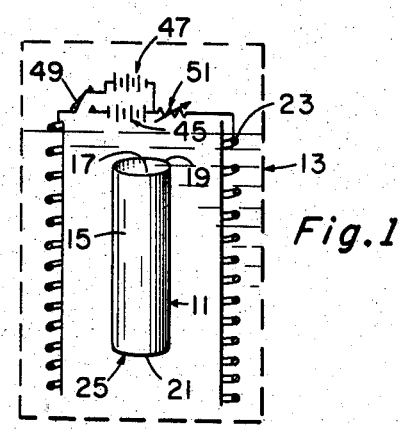
FIG. 1 is a partial cross section of a type I superconducting cylinder.

In understanding the discovery of this invention, reference is made to FIG. 1, which illustrates a thin walled hollow cylinder 11 of type I superconductors such as Pb, Sn or In, although other type I superconductors may be used. A suitable cryostat 13 containing liquid helium in a vacuum around cylinder 11 suitably cools the cylinder 11 to below its critical temperature $T_c$, at which point the cylinder changes abruptly from its normal resistance state to its superconducting state. The latter state is characterized by its lack of resistance to the flow of electrical current therethrough, as is well known in the art, for example, as is described in U.S. Pat. No. 3,177,408 by Mills et al. The cylinder 11 is of high purity, for example, 99.999 percent polycrystalline Pb or Sn with average grain sizes from $\sim 10^3$—$10^4$ microns. Advantageously, as will be understood in more detail hereinafter, etching along the outside surface 15, inside surface 17, and opposite ends 19 and 21 of cylinder 11 removes surface strains from the cylinder 11. Suitable etching solutions, comprise either 20 percent peroxide in glacial acetic acid or 5 percent $HNO_3$ in methyl alcohol.

When an increasing externally imposed magnetic field below the critical field $H_c$ of cylinder 11 is applied to cylinder 11 by energizing a solenoid 23 with an increasing electrical current, in one direction around cylinder 11 and coaxial therewith, the cylinder 11 shields the field from penetrating the outside surface 15 of the cylinder 11. Thus there is no field penetration into the bore 25 of cylinder 11 as long as the solenoid 23 produces a field strength below the critical field strength $H_c$ of cylinder 11. When the solenoid current is increased sufficiently, however, the magnetic field produced thereby exceeds the critical field $H_c$ of cylinder 11 and this field penetrates into the bore 25 of cylinder 11 through wall 27 of cylinder 11 from the outside surface 15 through the inside surface 17 thereof.

The predicted retention of the magnetic field in bore 25 of ideal type I superconducting cylinders, and also hollow rings, have been discussed in "Superconductivity" by D. Schoenberg, 27—34, Cambridge Press (1952); "Superfluids" Vol. 1, by F. Londen, Dover Pub., N.Y. (1961) and "Prog. in Mater. Sci." 12, No. 3, 209 (1964) by J.D. Livingston et J. D. The thermodynamic and electrodynamic treatment by the above-cited london publication, requires that the equilibrium state of a simply connected Type I superconductor satisfies the conditions B =0 and B =0 where B is the magnetic induction. For the multiply connected superconducting ring, the London conditions, described in pages 11 and 47—51 of the above-cited London publication, are $d\Phi c/dt=o$ or $\Phi c$ =constant where $\Phi c$, and the fluxoid becomes the magnetic flux when the wall thickness is greater than the penetration depth. This treatment and the treatment by the cited Shoenberg publication, predict that the systems will shield to that value of the external field that drives some portion of the sample into the intermediate state. Thus, in type I superconductors, a uniform field is predicted to be retained in the bore after an external field exceeding $H_c$ is removed, the prediction being that the retained field is approximately equal to the shielding field. The discussion given by the above-cited Livingston publication for ideal hollow cylinders (ignoring end effects) also predicts that the type I superconductor cylinder will shield to $H_c$ when it abruptly goes normal so that when the externally applied field is decreased to below $H_c$ the bore is predicted evenly to retain the flux at $H_c$ and the field is predicted uniformly to remain trapped therein as the external field goes to zero. Measurements of the flux trapped in an actual hollow lead cylinder 11, however, showed that, contrary to expectations for the ideal type I superconductor cylinders, the retained field in the bore of the cylinder 11 is up to more than an order of magnitude less than the measured critical fields when the externally applied field ($H_{ex}$) is removed. Moreover, this deviation from the behavior of the ideal type I superconductor model was not due to end effects.

In accordance with the discovery of this invention, it has been found that the retained field inside the cylinder 11 depends strongly on the state of the surface of the cylinder. Accordingly, should the surface of cylinder 11 be strained on the inside or outside surfaces 17 and 15, large magnetic fields can be retained in the bore 25 of cylinder 11. Moreover, if both the inside and outside surfaces 17 and 15 are uniformly strained, the field retained in bore 25 of cylinder 11 can be up to the critical field $H_c$ of the cylinder 11. Additionally, it has been discovered in accordance with this invention, that localized strains can produce retained field gradients in bore 25 of predetermined size, shape and strength. Moreover, fields of both senses can be retained in the bore 25 of a locally strained cylinder 11 simultaneously when cycles are performed involving both senses of the applied field.

In accordance with this invention, the surface strains are produced by machining, sanding with various grades of silicon carbide cloth, sandblasting with $50\mu$ aluminum oxide particles, strain elongation, mechanical twisting and various chemical procedures. For example, slow, prolonged oxidation in moist air produced surfaces, comprising oxides, hydroxides and carbonates with occasional localized pitting, which generated dislocations resulting in a gradual increase of the field retaining properties with oxidation time. On the other hand, rapid oxidation of etched Pb samples in a 200° C. flowing airstream produced a uniform blue-brown oxide in ~ 15 minutes, but these oxides on cylinders 11 that retained fields as low as 0.03 $H_c$ produced no detectable increase in retained fields. Lightly etched sandblasted samples in which the surfaces were macroscopically rough generally retained smaller fields than machined samples in which the surface was relatively smooth.

The field measurements were made with a number of different Hall probes having precisions ranging from ±0.1 Oe to ±5 Oe, depending on the probe and probe current. The external fields were generated by a 14 inches long copper solenoid immersed in liquid nitrogen. The inside diameter of the solenoid was 1½ inches. Probe measurements showed that the maximum axial variation of the solenoid field region in which the superconducting cylinders were placed did not exceed 3 percent of fields less than 2000 Oe. No measurable radial variation was detected. The effects described herein, are about two orders of magnitude greater than the maximum total estimated errors resulting from all the techniques and calibration procedures used.

The field distributions associated with the surface strains described herein do not change when the Pb samples are annealed, particularly after treatments that produce grain growth in the bulk of the superconductor material. For example, strained Pb samples retained high fields even after prolonged periods of annealing (~ 3 months) at room temperature or by annealing in boiling glycerol (~270°C.) for several hours. In this regard, no visible change in the surface grain size occurs after annealing strained small grained Pb samples at 270 C., although removal of the surface layer by etching showed an underlayer of increased grain size produced by heat treatment. As described above, the etch solutions used, comprised 20 volume percent of $H_2O_2$ in glacial acetic acid or 5 percent concentrated nitric acid in methyl alcohol.

Figure 2:
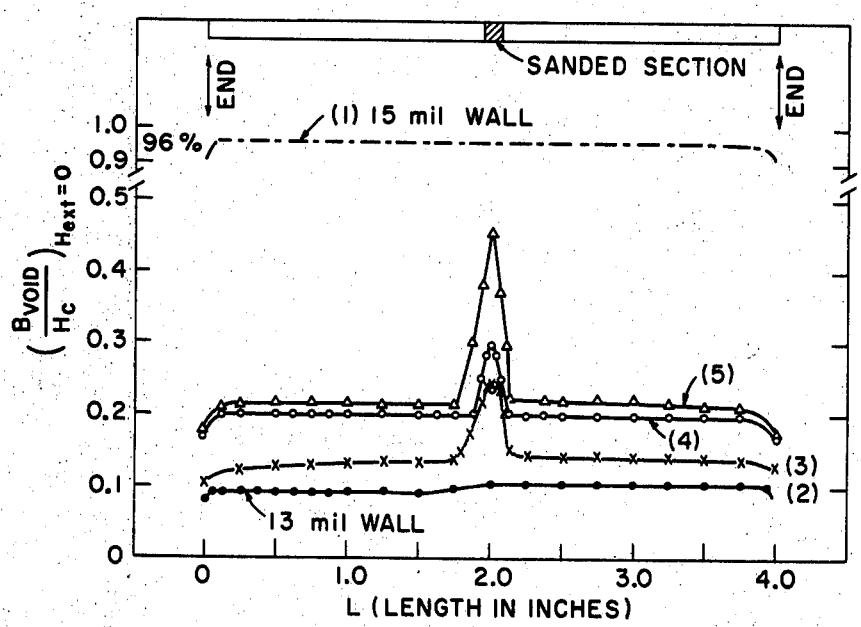
FIG. 2 is a partial schematic cross-sectional view of the cylinder of FIG. 1 having a locally strained portion in accordance with the method of invention, together with a graphic illustration of the particular field gradient produced in the bore of the cylinder due to this straining.

The field distribution along the length of a sandblasted cylinder 11 of Pb with a wall thickness of 15 mils and an i.d. of 150 mils is shown in curve 1 of FIG. 2. The distribution was obtained after the field exceeding $H_c$ was applied and removed at 4.2° K. The retained field in the bore was found to be uniform along the length to within one-sixteenth inch from each end with an absolute magnitude of 0.96 $H_c$ ±2 percent and reproducibility to ±0.1 percent. The fall off in the outer one-sixteenth of an inch at each end amounts to 5 or 6 percent. Curve 2 of FIG. 2 was obtained after five 30-second etches in $4HA_c$–$1H_2O_2$. After each etch, the sample was rinsed in either water, alcohol or glycerol and dried before measuring. Measurements between etches showed a systematic monotonic reduction in retained field with each etching.

After curve 2 of FIG. 2 was obtained, the center ⅛-inch section of the inside surface was lightly sanded as shown schematically in the upper part of FIG. 2. The field gradient distribution resulting after this procedure is shown in curve 3 of FIG. 2. A higher field, illustrated by curve 4 of this FIG. 2, was produced after sanding the ⅛-inch section on both surfaces.

Other measurements in which one surface was completely etched and one was completely sandblasted show that strains in the outer surface are slightly more effective in increasing field retention than are strains on the inner surface. The higher field, illustrated by curve 5 of FIG. 2, was obtained by applying more pressure during sanding.

Figure 3:
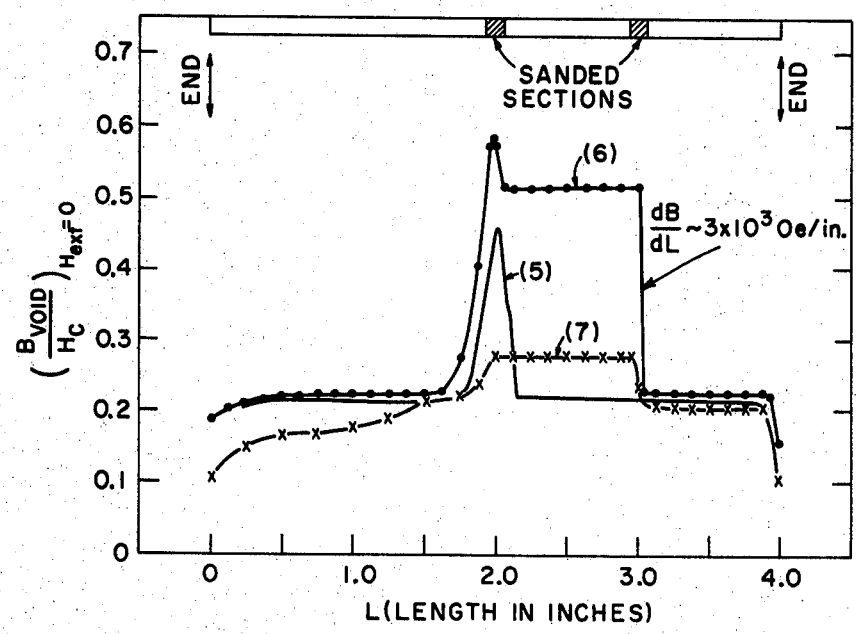
FIG. 3 is another illustration of the cylinder of FIG. 2 together with a graphic presentation of the particular field gradient produced in the bore of the cylinder due to a particular localized, straining in accordance with another embodiment of the method of this invention.

A second section of both surfaces was sanded asymmetrically as shown in the upper part of FIG. 3. The resulting field gradient distribution is given by curve 6 in FIG. 3. In these tests, it was found that the increase in the center peak and the plateau extending between the two strained spots are not due to a spread in strain but result from field interactions that tend to minimize gradients between strains.

The probe measurements showed that the fall off of ~150 Oe at the point denoted by 3 inches occurred in a region of width between one-sixteenth and one thirty-second of an inch. Curve 7 of FIG. 3 was obtained after a 30-second etch. Further etching reduced the field trapping to the shape and values of curve 2 of FIG. 2 or slightly lower values depending upon whether the wall thickness was reduced. These samples, which exhibited field gradients in the bore between $10^3$ to $10^4$ Oe/in. as described and shown, were cycled between 4.2° K. and 300° K. thirty times, annealed at room temperature for 3 weeks, measured with different probes under conditions where the probes were stationary or could be moved at 4.2° K. The maximum spread observed after these procedures was ±5 Oe.

Figure 4:
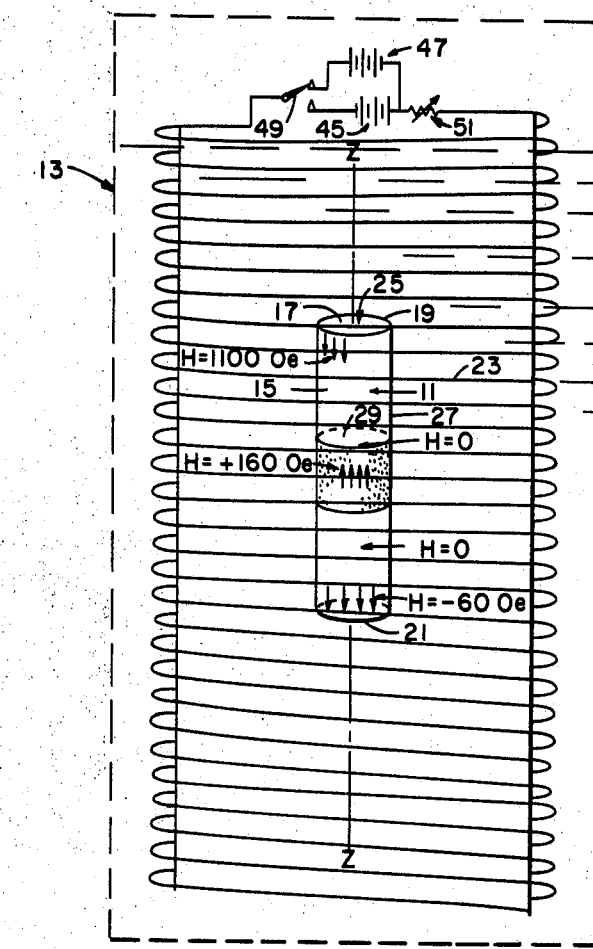
FIG. 4 is a partial three-dimensional view of a dipole produced by the method of this invention as applied to the cylinder of FIG. 1.

In a further practical embodiment, this invention provides a particular field gradient for deflecting high energy, charged particles traveling along a z-z axis. However, as will be understood the field gradients produced by the method of this invention can be used for any application where cylindrical magnets or field gradients are required. In this embodiment, a hollow cylinder 11 is strained by circumferentially sanding a central ring-shaped annular, cylindrical section 29 of the outside 15 of the hollow cylinder 11, as illustrated in FIG. 4. The described sanding cloth and procedure is advantageously employed for a hollow lead cylinder 11. However, any other type I superconductor, such as the above-mentioned ones, may be used. Also, any of the mentioned straining procedures may alternately be employed, alone or in combination.

The solenoid 23, whose characteristics and parameters are described above, has conventional power sources 45 and 47 of different polarities, a switch 49 and variable resistance 51 for variably energizing the solenoid in a circuit with increasing current in one direction to produce an axial magnetic field around the outside surface 15 of the superconducting cylinder while a conventional cryostat, such as described above but which is not shown in FIG. 4 for ease of explanation, holds the strained cylinder 11 at the temperature of liquid nitrogen, which is below the critical temperature $T_c$ of the cylinder 11. The field produced by the solenoid 23 increases from a strength below the critical field $H_c$ of cylinder 11 to a strength above the critical field $H_c$ of cylinder 11, so that the externally produced field produced by the solenoid penetrates into the bore 25 of the cylinder 11. Then, the solenoid circuit from its power source is opened by opening switch 49 whereby the solenoid current is rapidly reduced to zero and the desired field is retained in the bore 25 of the cylinder 11 with a gradient strength and direction as indicated in FIG. 4.

As will be understood in the art, the retained field of this cylinder 11 of FIG. 4, has the advantage that the gradient is up to about the critical field of the cylinder and requires no electrical power source for maintaining the strength or gradient of the retained field in bore 25. Moreover, the described method has the advantage of simply, effectively and economically producing large controllable variations in the magnitude of a magnetic field along the length of the bore of cylinder 11.

Figure 5:
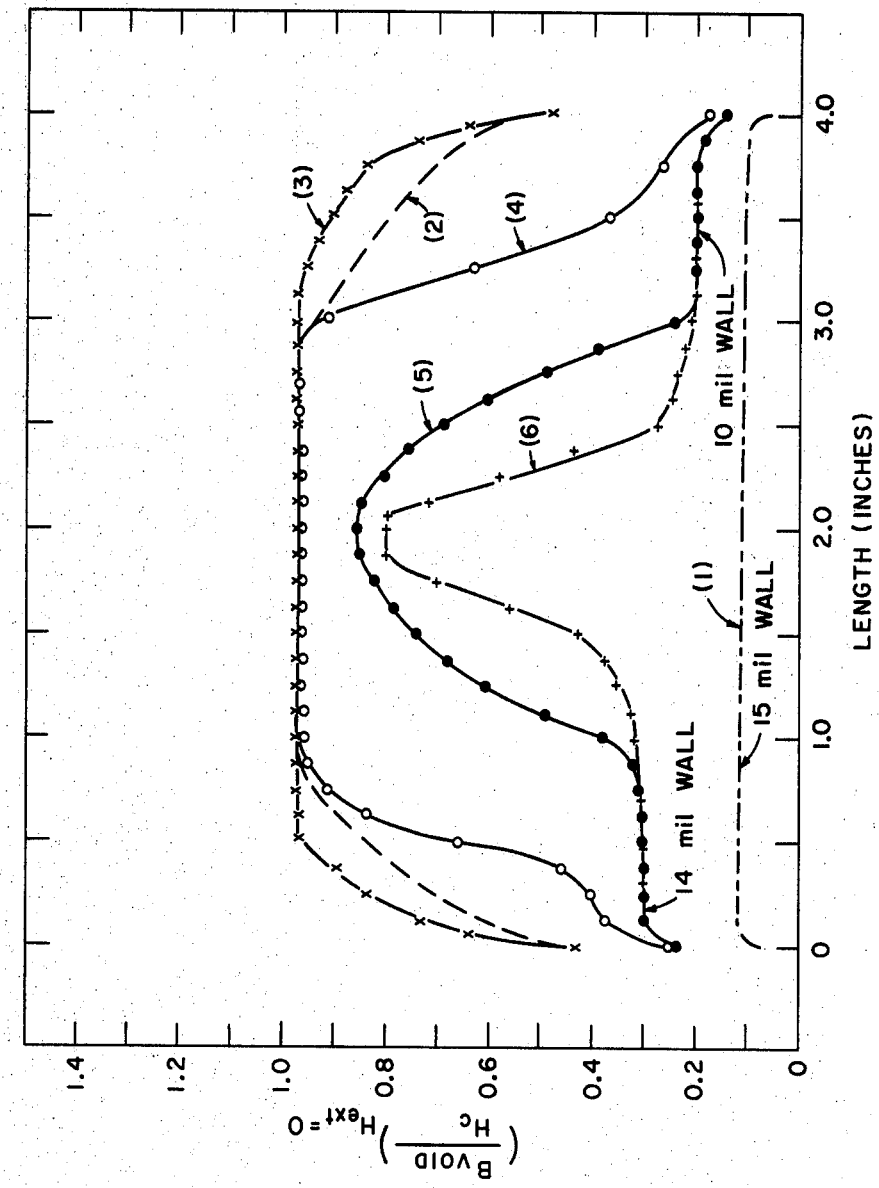
FIG. 5 is a partial graphic illustration of another embodiment of the straining method of this invention as applied to the cylinder of FIG. 1.

The above-described retained field gradients were obtained by local surface straining of a cylinder 11 in which the surface strains were minimal initially. The reverse procedure of removing strains is illustrated in FIG. 5. The original Pb cylinder 11 was 4 inches long with a 15 mil thick wall and an i.d. of 300 mils. After the cylinder 11 was machined to these dimensions it was etched with the above-described etching constituents until curve 1, illustrating a uniform low field in bore 25, was obtained. The cylinder 11 was then sandblasted uniformly along its inside and outside diameters only whereupon the centrally located uniform high field in bore 25, illustrated by curve 2, was obtained. A second sandblasting of the ends only of cylinder 11 resulted in curve 3, showing increased field adjacent the ends 19 and 21 of cylinder 11. Curve 4 was obtained by etching the end surfaces 19 and 21 and the inside and outside surfaces 17 and 15 of cylinder 11 over a length of ~½ inch from the ends 19 and 21, illustrating that the field in the bore 25 adjacent the etched ends of the cylinder was reduced by the etching. Curve 5 resulted after etching 1-inch lengths of the inside and outside surfaces 17 and 15 at each end of the cylinder 11 and curve 6 resulted from a like etching of 1½ inch leaving the center 1-inch section of the cylinder sandblasted. These latter two curves illustrate the production of large retained field gradients in bore 25 of cylinder 11 by the selective local straining method of this invention. In this example, the variation in wall thickness of cylinder 11 varied from a 14 mils thickness at the ends thereof to a 15 mils thickness along the center section thereof, as illustrated in FIG. 5.

The cylinder 11 that produced the curve of FIG. 5, also showed that the etched portion of the wall of cylinder 11 has the additional unexpected property of retaining magnetic field gradients in the bore 25 thereof, depending on a subsequent normal resistance state and subsequent fields externally applied thereto by solenoid 23. In this example, the centrally sandblasted cylinder 11 having etched ends was removed from a helium bath in cryostat 13 to drive cylinder 11 normal after the externally applied field had been applied and removed therefrom to produce the retained field gradient of curve 6 of FIG. 5. The cylinder 11 was thereafter again cooled in cryostat 13 in the absence of an applied field. The field gradient distribution in bore 25 illustrated by curve 1 in FIG. 6, was obtained when the external field was increased from zero to 0.3 $H_c$. After these measurements were completed, the external field was increased further to 0.4 $H_c$, resulting in curve 2. Further increases produced the field gradient distributions shown by curve 3 wherein the increasing externally applied fields raised the maximum retained fields in bore 25 closer and closer to the critical field $H_c$.

Figure 6:
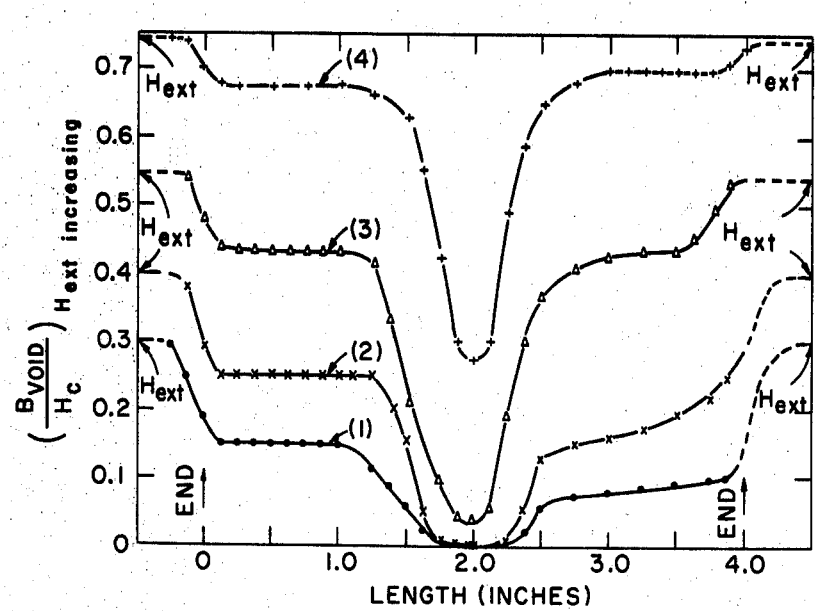
FIG. 6 is a partial graphic illustration of the field gradient provided in the bore of the cylinder of FIG. 1 upon the application, removal and reapplication of various magnetic fields externally applied thereto.
Figure 7:
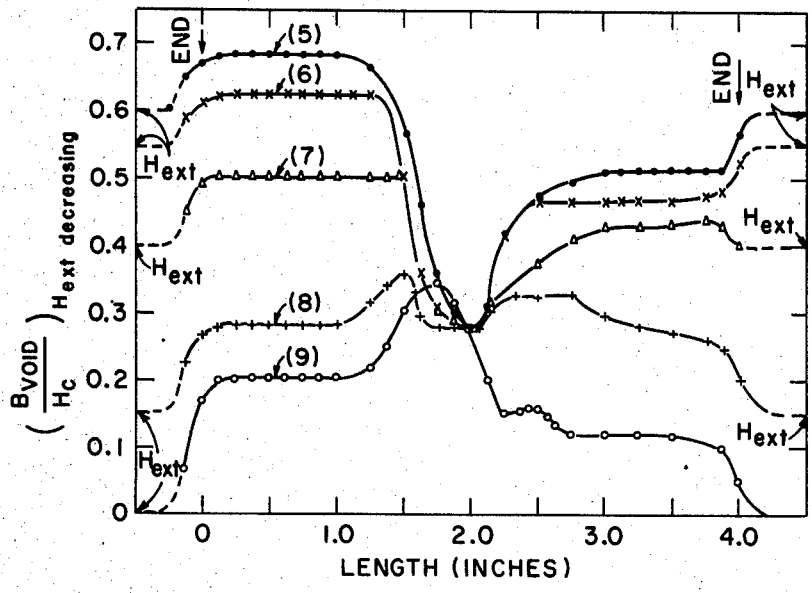
FIG. 7 is a partial graphic illustration of still further field gradients produced in the bore of the cylinder of FIG. 1 in accordance with this invention.

After obtaining the curve 4 of FIG. 6, the external field of 0.4 $H_c$ was then reduced on the same cylinder 11 having a sandblasted central portion and etched ends. The field distributions occurring in this and further sequentially decreasing fields are shown in curves 5—9 of FIG. 7, illustrating how the method of this invention produces nonsymmetrical field gradients in the bore 25 of cylinder 11.

In another aspect, the straining method of this invention provides the additional new and unexpected advantages that fields of opposite sign (polarity) can be retained in the bore 25 of cylinder 11 and these fields can be varied in both position and magnitude. In this regard, the distributions in sign and magnitude depend upon the local strains produced in the superconductor wall 27 of cylinder 11 by the method of this invention. Moreover, as will be understood from the above and in more detail hereinafter, the new and novel superconductor devices produced by the method of this invention have a field distribution that is distinguished from the distribution of the field produced by the magnets known heretofore.

Figure 8:
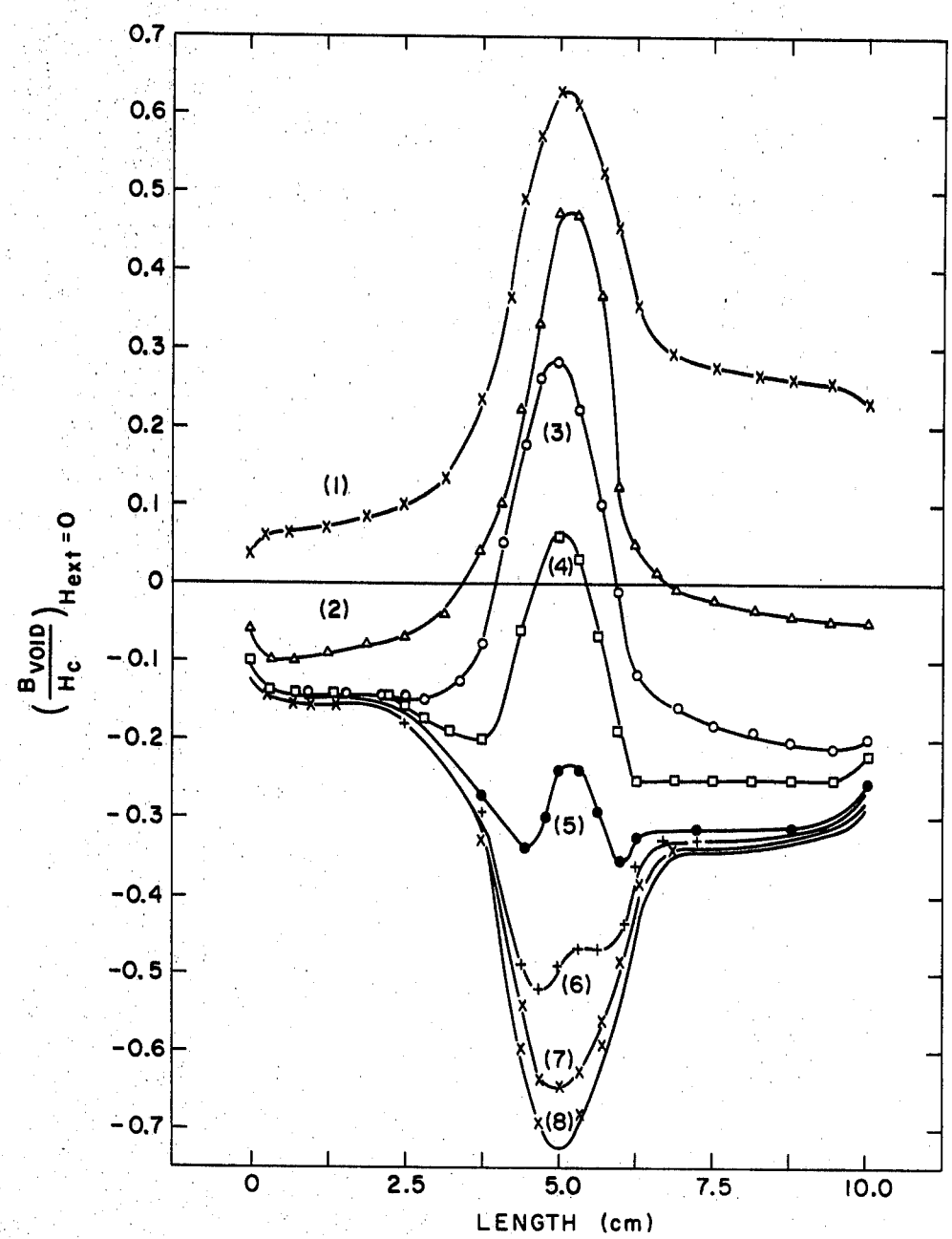
FIG. 8 is a partial graphic illustration of fields of opposite polarity retained in bore of a superconductor cylinder in accordance with another embodiment of this invention.

To achieve fields of opposite sign in accordance with this invention, a field exceeding $H_c$ is applied and removed from the circumferentially strained cylinder 11 of FIG. 4 by energizing solenoid 23 in one direction with sufficient DC current in a circuit from source 45 and then opening the circuit with switch 49. Switch 49 was then closed in a circuit from source 47 to provide a new polarity of DC current in the external solenoid 23 while a variable resistance 51, such as a rheostat, was adjusted to produce an applied field of 0.15 $H_c$ of negative sense relative to the original field which was applied and removed. The distribution of the field retained along the length of cylinder 11, in the absence of the external field, is illustrated by curve 1 of FIG. 8. After these measurements, the negative field applied before removal was 0.45 $H_c$, as illustrated by curve 3 of FIG. 8. Curves 4, 5, 6, 7 and 8 illustrate similar procedures where the respective maximum applied negative fields corresponded to 0.6 $H_c$, 0.75 $H_c$, 0.85 $H_c$, 0.9 $H_c$, and 2.0 $H_c$. Curves 2, 3 and 4 illustrate the fields of both senses that were retained simultaneously.

It has also been discovered in accordance with this invention that the described strained hollow type I superconductor cylinder retains fields in the wall thereof and exhibits spontaneous enhancement of the field in the bore of the cylinder when cooled from above to below $T_c$ in an external field below the critical field $H_c$ when the latter is applied by the described solenoid. Moreover, when this external field is removed after cooling below the superconducting transition temperature, the wall retains field, and subsequent decreases and increases between the transition temperature and lower temperatures caused the fields in the wall and in the bore of the cylinder reversibly to exchange both in the presence and absence of the externally applied field.

Consider the properties conventionally expected when a hollow superconducting cylinder is cooled from above $T_c$ to temperatures below $T_c$ in a static external field produced by the described solenoid. In the conventional frame of reference used heretofore, the Meissner effect should be the same whether the cylinder is continuous or split. However, in an equilibrium solution model, in accordance with this invention, a new superconducting phase with internal fields can and does exist in which the chemical potential is the same as that of a diamagnetic phase. Moreover, an equilibrium configuration is obtained where some field is retained in the wall of the cylinder and the Meissner effect is reduced. Thus, when the new superconducting phase of this invention attempts to reach its lowest free energy value, it coexists in equilibrium with the diamagnetic state by spontaneously creating a field inside the wall of the cylinder that is greater than the applied field (i.e., its own vapor pressure). Accordingly, an internal field in the bore of the cylinder is built up by expulsion from the wall of the cylinder into the bore of the cylinder from magnetic induction originally present in the wall of the cylinder at the transition temperature and a balance is obtained between two opposing processes, i.e., a tendency to retain induction in parts of the wall of the cylinder and a necessity to build up internal field in the bore of the cylinder from flux expelled by the wall. In accordance with the discovery of this invention, therefore, a solution model is provided, which functions as an intrinsic flux pump. A detailed mathematical treatment of this solution model of this invention is discussed in Brookhaven National Laboratory Report, BNL 50082(S–70) dated Dec. 31, 1967.

The measurements for the intrinsic flux pump aspect of this invention were made in the bore of Pb, Sn and/or In cylinders varying in length from 500 to 2000 mils for 15, 20 and 100 mil thick wall cylinders and inside diameters of 150 mils. Measurements were made at final temperatures above and below the lambda point of helium. While these measurements primarily involve cylinders that were completely strained by the above described method, the field enhancement of this invention also is produced in the bore of the described locally strained cylinders that produce retained field gradients in the bore thereof.

Just as the final equilibrium state of an undersaturated solution is thermodynamically constrained by the amount of solute available, the final state of the hollow cylinder with an arbitrarily thin wall is restricted by the amount of magnetic induction available in the wall when it becomes superconducting with temperature in a field.

Consider an isolated solution in which one component exists both in the condensed phase and in the vapor phase. If such a system is subjected to temperature cycling, the component common to the vapor and condensed phases will exchange reversibly between both phases. In accordance with the discovery of this invention the equivalent is applicable to the described type I hollow cylinder by removing the applied field after the system has been cooled below the transition temperature for that applied field.

It was found in accordance with this invention that after cooling from $T_c$ in the applied fields the changes are reversible with temperature, and exhibit the behavior shown in FIG. 9a. For a cylinder of given o.d. and i.d., the field in the cylinder bore begins to exceed the value of the applied field at the temperature corresponding to the critical temperature for the applied field. As the temperature is lowered progressively, the field in the cylinder bore increases with the same temperature dependence as that of the critical field of the wall material. At a temperature determined by the radial dimensions of the cylinder the enhancement ceases. Upon further cooling the field in the cylinder bore remains constant. The changes occurring when the temperature is subsequently increased follow the same curves as those obtained during cooling.

Removal of an external field exceeding $H_c$ at a temperature below the transition temperature for the applied field, produces retained field, as described above. Thereupon, lowering of the temperature of the cylinder 11, produces enhancement of the field retained in the bore 25 of the cylinder 11 in accordance with this invention. The effect shows that field lines are pumped into the cylinder bore 25 that come from field retained by the wall 27 of the cylinder 11 in the superconducting state. Moreover, subsequent temperature cycling between the temperature at which the external field was removed and lower temperature shows reversible increases and decreases of the field in the cylinder bore 25 in the absence of an external field, such as produced by solenoid 23.

The data were obtained by heating and cooling a Sn cylinder 11 for 10 cycles between 2° and 1.0° K. in the absence of an applied field after initial cooling from about $T_c$ to 2° K. in an external field of 200 Oe, as illustrated in FIG. 9b. The same reversible effect was observed in a 2-inch long In cylinder 11 (o.d., 760 mils; i.d., 150 mils), which was cycled between 2.0° and 1° K. for 15 cycles. The In cylinder 11 was cooled from 4.2° K. in a field of 160 Oe. At 2° Oe. At 2° K. (Hc ≅ 175 Oe) the external field from solenoid 23 was removed. Subsequent cooling and heating between 2° and 1° K. showed spontaneous reversible increases and decreases of the field in the cylinder bore 25. Confirmation that the field in the cylinder bore 25 could equal the critical field was obtained from subsequent isothermal magnetization measurements between 2° K. and 1° K. The results showed that the cylinder wall 27 acts as a reversible reservoir for field lines entering and leaving the cylinder bore 25, i.e., no field leaves the system.

This invention has the advantage of simply, effectively and easily providing various retained magnetic field gradients in the bore of Type I superconducting cylinders. To this end various externally applied magnetic fields are applied to and removed from selectively etched and/or locally strained type I superconductors to provide a variety of desired field gradients, which are retained in the bore of the cylinder up to the critical field $H_c$ of the superconductor after removal of the externally applied field and independently thereof. Moreover, by externally applying reverse fields to the cylinder, fields of opposite polarities are retained in the bore of the cylinder. Additionally, spontaneous field enhancement is produced in the bore of a superconducting cylinder in accordance with this invention.

We claim:

1. The method of controlling the strength, gradient and location of the magnetic fields retained in the bore of a hollow superconductor cylinder as a result of immersing said cylinder at superconducting temperatures in externally applied magnetic fields above the critical field of the cylinder, and relatively removing said cylinder from said externally applied fields, comprising the steps of etching a type I superconductor cylinder, which is hollow and forms a bore, in order to remove surface strains from said cylinder and introducing local surface strains into at least one discrete surface area of said cylinder for producing characteristic magnetic field shielding properties in said cylinder corresponding to the amount and location of said strains for effecting the strength, gradient and location of said retained magnetic fields in said bore in accordance with the amount and location of said shielding in said cylinder.

2. The method of claim 1 in which the inside and outside surfaces of said cylinder are strained for producing a cylinder capable of retaining fields in the bore of said cylinder up to the critical field $H_c$ thereof.

3. The method of claim 1 in which said local surface strains are introduced into said surface area of said cylinder by sandblasting a portion of said cylinder that has been etched so as selectively to increase the amount of said shielding at the location of said etching in correspondence with the amount and location of said sanding.

4. The invention of claim 1 including the steps of varying the amount of said shielding corresponding to said local surface strains by selectively varying said strains in said surface of said cylinder by a sequence of localized etching, straining and etching wherein said latter etching removes controlled amounts of said straining during periods of up to about thirty seconds duration.

5. The method of claim 1 in which said local surface strains are established in the surface of a cylinder that has been etched to remove prior surface strains from said cylinder, whereby said strains are localized to a portion of said cylinder exposed to said etching, and whereby further etching of a portion of said cylinder containing said strains can reduce a portion of said strains for reducing said shielding for controlling the amount and location thereof.

6. The method of claim 1 in which a central annular ring-shaped portion of said cylinder is sanded to introduce said local surface straining therein.

7. The method of claim 1, comprising the steps of locally straining selected discrete areas of at least one extended surface of said hollow cylinder, said straining corresponding in location and amount to the location and strength of an $n$ pole magnetic field where $n$ is any positive integer other than zero, cooling said cylinder below the critical temperature of said superconductor, and while at said temperature exposing said cylinder to said externally applied magnetic fields in a cycle of opposite sense and different strengths above and below the critical field of said superconductor to produce retained field gradients of opposite sense and different strengths in said cylinder after said straining such that said magnetic fields retained within said bore of said cylinder at the conclusion of said cycle exhibit an $n$ pole magnet distribution.

8. The invention of claim 1 in which said cylinder is exposed to externally applied fields of different polarities above and below the critical field of said superconductor to produce retained field gradients of different polarities in said cylinder after said straining.

9. The invention of claim 1 in which the strength of the field retained in the bore of the cylinder is spontaneously increased up to the critical field of the cylinder by decreasing the temperature of the cylinder from its critical temperature to a lower temperature.